(12) United States Patent
Murphey et al.

(10) Patent No.: US 10,879,505 B2
(45) Date of Patent: Dec. 29, 2020

(54) WEARABLE POWER SUPPLY SYSTEM

(71) Applicants: Ryan Joseph Murphey, Laguna Niguel, CA (US); Eric Lyon, Los Angeles, CA (US)

(72) Inventors: Ryan Joseph Murphey, Laguna Niguel, CA (US); Eric Lyon, Los Angeles, CA (US)

(*) Notice: Subject to any disclaimer, the term of this patent is extended or adjusted under 35 U.S.C. 154(b) by 0 days.

(21) Appl. No.: 16/530,922

(22) Filed: Aug. 2, 2019

(65) Prior Publication Data

US 2020/0044207 A1    Feb. 6, 2020

Related U.S. Application Data

(60) Provisional application No. 62/720,431, filed on Aug. 21, 2018, provisional application No. 62/714,163, filed on Aug. 3, 2018.

(51) Int. Cl.

| | |
|---|---|
| *G06F 1/16* | (2006.01) |
| *H01M 2/10* | (2006.01) |
| *A45F 5/02* | (2006.01) |
| *G01S 19/42* | (2010.01) |
| *G06K 19/06* | (2006.01) |
| *H01R 13/639* | (2006.01) |
| *H01R 24/60* | (2011.01) |

(Continued)

(52) U.S. Cl.
CPC ............ *H01M 2/1005* (2013.01); *A45F 5/02* (2013.01); *G01S 19/42* (2013.01); *G06F 1/163* (2013.01); *G06K 19/06028* (2013.01); *H01M 10/0525* (2013.01); *H01R 13/639* (2013.01); *H01R 24/60* (2013.01); *H02J 7/00* (2013.01)

(58) Field of Classification Search
CPC ........................................................ G06F 1/163
See application file for complete search history.

(56) References Cited

U.S. PATENT DOCUMENTS

| | | | |
|---|---|---|---|
| 6,675,446 B2* | 1/2004 | Buettell | G09F 21/02 24/115 H |
| 7,618,260 B2* | 11/2009 | Daniel | A44C 5/0007 24/311 |

(Continued)

FOREIGN PATENT DOCUMENTS

| | | |
|---|---|---|
| EP | 0693813 A1 | 1/1996 |
| EP | 3144864 A1 | 3/2017 |
| WO | 2016054641 A1 | 4/2016 |

OTHER PUBLICATIONS

International Search Report & Written Opinion issued in corresponding International Patent Application No. PCT/US2019/045008 dated Nov. 14, 2019, pp. 1-8.

*Primary Examiner* — Robert J Hoffberg
(74) *Attorney, Agent, or Firm* — Tutunjian & Bitetto, P.C.

(57) ABSTRACT

Systems and methods for vending one or more portable, user-replaceable power supplies using an enclosure with one or more shelf-type structures. A plurality of charging ports is integrated into the shelf-type structures for charging a power supply for type of user device. A user interface is utilized to select a vending function of the system, a receiving portion accepts and recharges one or more user-returned power supplies, and a delivering portion transfers one or more power supplies to a user in response to a user selecting a power supply delivery vending function using the user interface.

11 Claims, 9 Drawing Sheets

(51) Int. Cl.
*H01M 10/0525* (2010.01)
*H02J 7/00* (2006.01)

(56) References Cited

U.S. PATENT DOCUMENTS

| | | | |
|---|---|---|---|
| 9,042,846 B2* | 5/2015 | Kang | H04B 1/385 |
| | | | 455/90.3 |
| 9,201,456 B2* | 12/2015 | Eldershaw | G06F 1/163 |
| 9,857,968 B2* | 1/2018 | Khalid | H04W 4/80 |
| 9,999,292 B1* | 6/2018 | Rainsong | A45F 4/00 |
| 2007/0278265 A1* | 12/2007 | Contente | A45F 5/02 |
| | | | 224/162 |
| 2007/0279852 A1 | 12/2007 | Daniel et al. | |
| 2008/0277441 A1 | 11/2008 | Zimmermann et al. | |
| 2011/0133695 A1* | 6/2011 | Cadway | H01M 2/1022 |
| | | | 320/114 |
| 2014/0054346 A1* | 2/2014 | Ledesma | A45F 3/14 |
| | | | 224/576 |
| 2014/0116085 A1* | 5/2014 | Lam | A41D 1/005 |
| | | | 63/1.11 |
| 2014/0368156 A1 | 12/2014 | Aloe | |
| 2017/0083857 A1* | 3/2017 | Barton | G06Q 10/0833 |
| 2018/0232757 A1* | 8/2018 | Leffelman | G06Q 30/0221 |

* cited by examiner

WEARABLE POWER SUPPLY SYSTEM

BACKGROUND

Technical Field

The present invention generally relates to power supplies and mounts, and more particularly to a wearable device holding system with a user-replaceable power supply.

Description of the Related Art

Smartphones and other portable computing devices (e.g., personal digital assistants (PDAs), tablets, phablets, cameras, etc.) are now commonly used throughout the day, and the batteries of such devices can run low, as users often carry such devices with them and often do not have access to an outlet for charging such devices. For example, at a concert, sporting event, festival, etc., electrical outlets for charging personal devices may not be readily available to users. Similarly, in a remote location (e.g., located in a wilderness area, park, beach, etc.) a user would not have access to an outlet to charge any portable computing devices. Conventionally, users can carry a spare battery and associated power cord to charge personal devices for situations in which there is no access to power outlets. However, such batteries and power cords are bulky and cumbersome to carry, and thus can increase the difficulty to carry, handle, and operate the personal device during charging. Thus, there is a need for an improved system which resolves at least the above-deficiencies present in conventional systems.

SUMMARY

In accordance with an embodiment of the present invention, a wearable device holding and charging system, including a lanyard with a housing with a recess for receiving a user-replaceable portable power supply is provided. The system includes at least one power providing cable for delivering power from the portable power supply to a user device, and for supporting the user device when the lanyard is worn by a user, and further includes a connector for removably securing the user device to the lanyard during charging while the lanyard is being worn by a user.

In accordance with an embodiment of the present invention, a system is provided for vending one or more portable, user-replaceable power supplies using an enclosure with one or more shelf-type structures. A plurality of charging ports is integrated into the shelf-type structures for charging a power supply for type of user device. A user interface is utilized to select a vending function of the system, a receiving portion accepts and recharges one or more user-returned power supplies, and a delivering portion transfers one or more power supplies to a user in response to a user selecting a power supply delivery vending function using the user interface.

In accordance with an embodiment of the present invention, a method is provided for vending one or more portable power supplies, including securely supporting and charging one or more portable power supplies using a vending enclosure with one or more shelf-type structures with two or more integrated charging ports configured to charge any type of portable power supply types. One or more user-returned portable power supplies are accepted and recharged responsive to a user-request submitted using a user interface for selecting a vending function of the vending enclosure. The one or more portable power supplies are transferred to a user in response to the user selecting a power supply delivery vending function using the user interface. Movement of the one or more portable power supplies is tracked and analyzed to generate and present targeted marketing content to the user.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
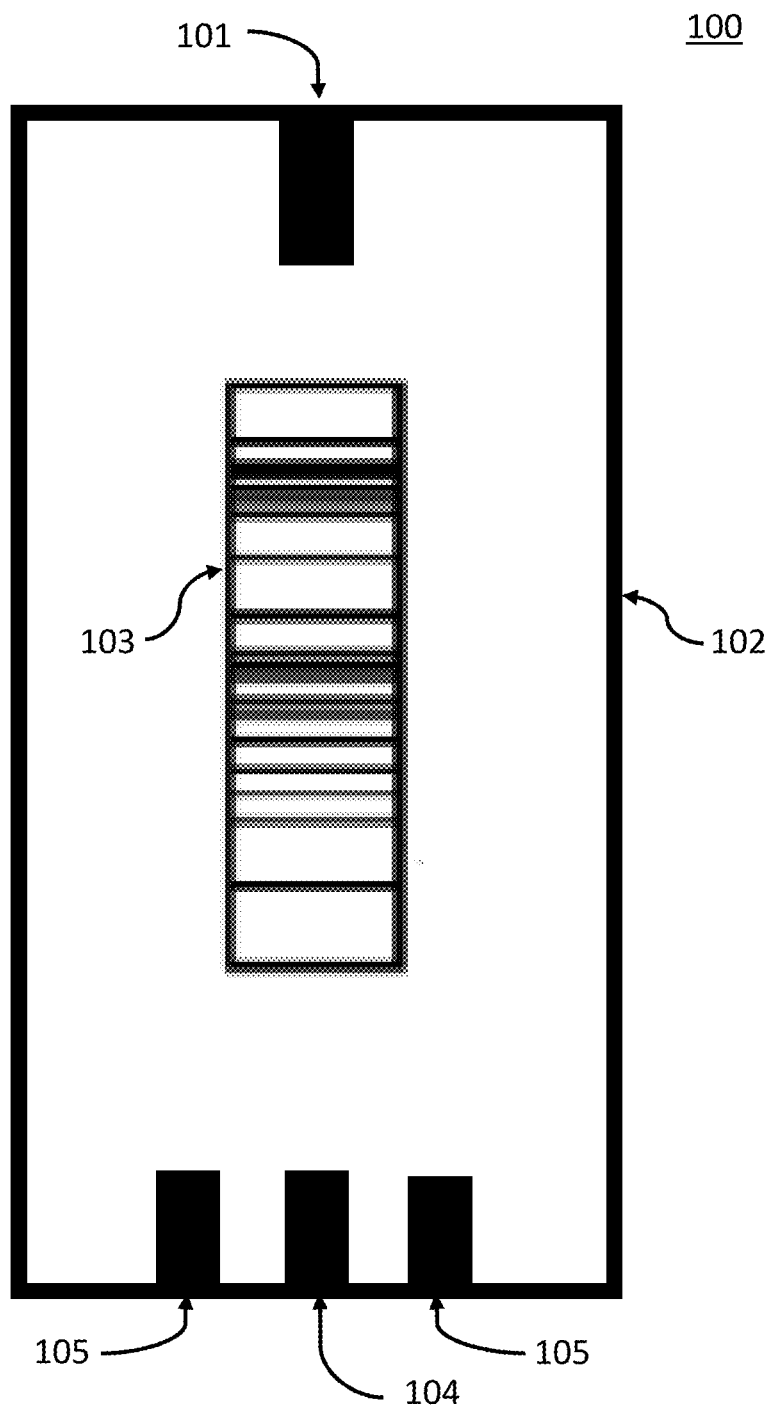
FIG. 1 is a perspective view of an exemplary removable power supply, in accordance with an embodiment of the present invention.

The present invention generally relates to holders for portable computing devices (e.g., smartphones, PDAs, tablets, phablets, cameras, etc.), and more particularly to a wearable portable user device holding system including a user-replaceable power supply. An aspect of the present invention is to provide a high capacity charging device and power supply dispenser for use in a wearable device holding system, in accordance with various embodiments. In some embodiments, the present invention can include a lanyard configured to charge and secure a portable user device (e.g., smartphone, PDA, tablet, phablet, camera, etc.) while being worn by a user. This improves usability of the device, prevents any potential dropping of the device, and enables hands-free, secure carrying and charging of any of a plurality of portable computing devices in accordance with various embodiments of the present invention.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a perspective view of an exemplary removable power supply system 100 is illustratively depicted in accordance with an embodiment of the present invention.

An exemplary removable and/or rechargeable battery 102 is depicted in accordance with an embodiment of the present invention. This battery 102 can be enclosed in a battery casing in some embodiments, and for ease of illustration, the combination of the battery 102 and the battery casing will be referred to as a battery 102 herein below. In some embodiments, the battery 102 can be placed and locked into any of a plurality of types of mounts, as described in further detail herein below with reference to FIGS. 2, 3, 4, 7, and 9. In some embodiments, the battery 102 can include one or more buttons 101 (e.g., power button, charge level checking button, etc.) and power terminals 105 built into battery casing of the battery 102. In accordance with various embodiments, the battery 102 can be inserted into any or a plurality of different devices capable of being powered by a battery, including, for example, the devices described with reference to FIGS. 2,3,4, 7, and 9 herein below.

In some embodiments of the present invention, the battery 102 can be used on its own with a USB-type cable or mount (not shown) by inserting the USB-type cable into a USB (or similar) type receiver 104 or mount, as described in further detail with reference to FIG. 2 herein below. Power can be transferred between (e.g. to and from) the battery 102 and any of a plurality of devices, including, for example, the devices described herein below with reference to FIGS. 2,3,4, 7, and 9 using power terminals 105 in accordance with aspects of the present invention. In some embodiments, when a battery 102 has been used and the power depleted, it can be placed into a charging station and/or dispenser, as described in further detail with reference to FIGS. 5 and 6 herein below. In some embodiments, a barcode 103 can be placed on one or more batteries 102, which can be utilized to, for example, identify and/or track any of the one or more batteries using a mobile device with a specialized application, as described in further detail with reference to FIGS. 8 and 10 herein below.

Figure 2:
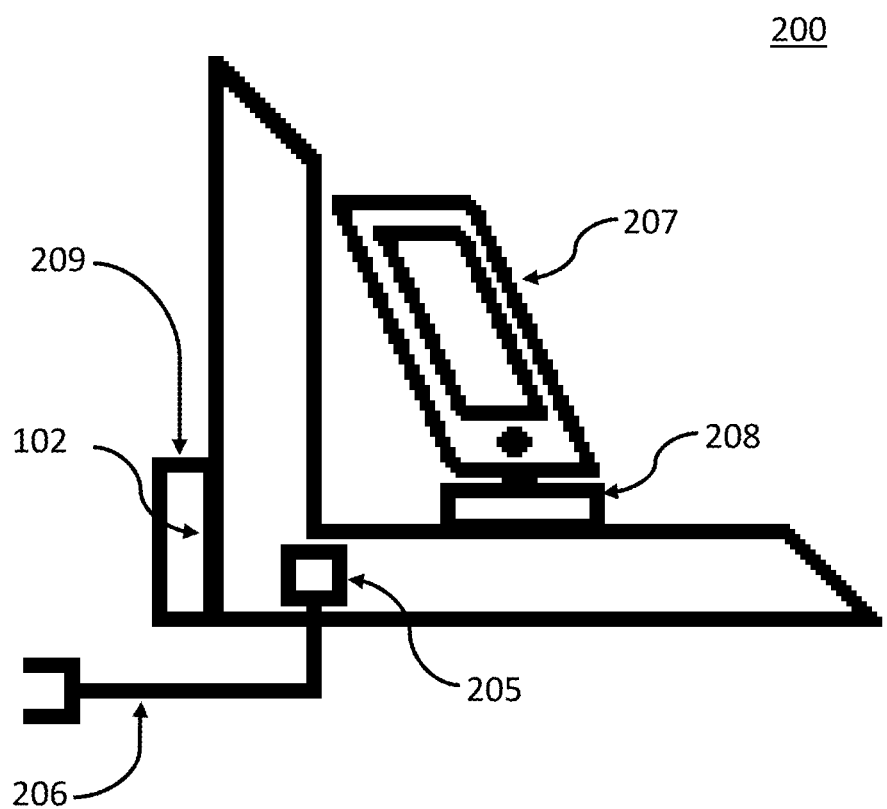
FIG. 2 is a perspective view of an exemplary portable charging station, in accordance with an embodiment of the present invention.

Referring now to FIG. 2, a perspective view of an exemplary portable charging station 200 is illustratively depicted in accordance with an embodiment of the present invention. In some embodiments, a portable charging station 200 can include a connector 208 (e.g., Apple®-type, USB-type, universal, etc.), configured to securely charge and connect a device 207 to the stand. In some embodiments, the connecter 208 can include a locking function (not shown) to lock the device 207 to the portable charging station 200. The charging station 200 can include a mount/receiver 209 configured to hold, secure, and/or receive a battery 102 in accordance with aspects of the present invention. A power port 205 can be plugged into a power source using power cord 206 (e.g., removable, not-removable) to charge any of a plurality of devices 207 and/or one or more batteries 102. In accordance with various embodiments of the present invention, the battery 102 can be removed from the mount/receiver 209, and is interchangeable and configured for compatibility with any of a plurality of user devices, including, for example, the systems 300, 400, 700, and 900 of FIGS. 3, 4, 7, and 9, respectively. In various embodiments, the system 200 can be attached to any of a plurality of surfaces using any appropriate attachment mechanism (e.g., micro-suction tape, hook and loop fastener, suction cup, clip, etc.), in any user accessible portion (e.g., dashboard, window, motorcycle gas tank, airplane seat, etc.) of a vehicle (e.g., automobile, bus, train, airplane, motorcycle, etc.) to secure and/or charge one or more user devices.

Figure 3:
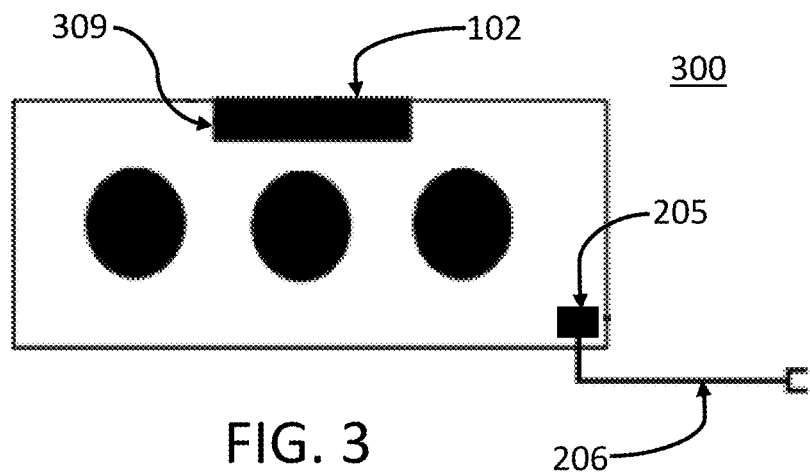
FIG. 3 is a perspective view of an exemplary speaker including a removable power supply, in accordance with an embodiment of the present invention.

Referring now to FIG. 3, perspective view of an exemplary speaker system 300 with a removable power supply 102 (e.g., rechargeable battery, non-rechargeable battery) is illustratively depicted in accordance with an embodiment of the present invention. In some embodiments, a speaker system 300 can include a mount/receiver 309 configured to hold, secure, and/or receive a battery 102 in accordance with aspects of the present invention. A power port 205 can be plugged into a power source using power cord 206 (e.g., removable, not-removable) to charge one or more batteries 102.

In accordance with various embodiments of the present invention, the battery 102 can be removed from the mount/receiver 309, and is interchangeable and configured for compatibility with any of a plurality of user devices, including, for example, the systems 200, 400, 700, and 900 of FIGS. 2, 4, 7, and 9, respectively. In various embodiments, a battery 102 can be utilized to provide electric power to any or a plurality of components of the speaker system 300, including, for example, Bluetooth, speakers, lighting, amplifier, etc.

Figure 4:
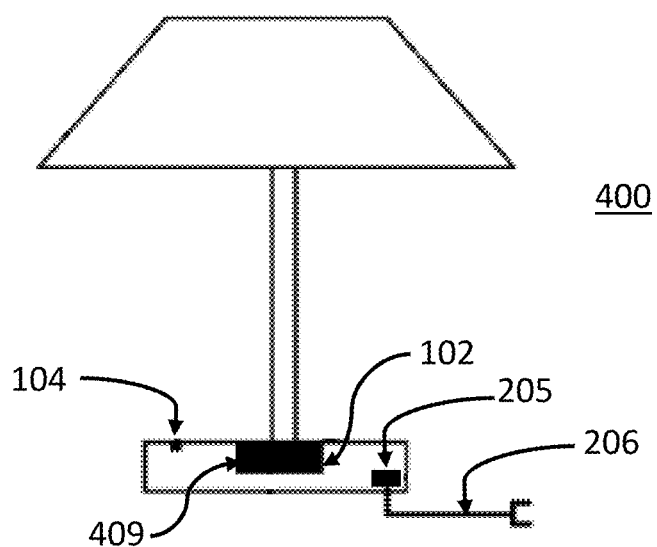
FIG. 4 is a perspective view of an exemplary lighting fixture including a removable power supply, in accordance with an embodiment of the present invention.

Referring now to FIG. 4, a perspective view of an exemplary lighting fixture 400 with a removable power supply 102 (e.g., rechargeable battery, non-rechargeable battery) is illustratively depicted in accordance with an embodiment of the present invention. In some embodiments, a lighting fixture 400 can include a mount/receiver 409 configured to hold, secure, and/or receive a battery 102 in accordance with aspects of the present invention. A power port 205 can be plugged into a power source using power cord 206 (e.g., removable, not-removable) to charge one or more batteries 102. In accordance with aspects of the present invention, upon charging of the portable power supply (e.g., by plugging directly into outlet or charging using the lighting fixture 400 by the mount 409), the lighting fixture 400 can detect a loss in power being provided via the power cord 206 (e.g., due to a power outage, being accidentally unplugged, circuit breaker issue, etc.), and automatically switch to operating and providing lighting and other functions by receiving power to the lighting fixture 400 from the attached portable power supply/battery 102.

In accordance with various embodiments of the present invention, the battery 102 can be removed from the mount/receiver 409, and is interchangeable and configured for compatibility with any of a plurality of user devices, including, for example, the systems 200, 300, 700, and 900 of FIGS. 2, 3, 7, and 9, respectively. In various embodiments, a battery 102 can be utilized to provide electric power to any or a plurality of components of the lighting fixture 400, including, for example, a conventional light bulb, LED lights, etc., and can further be utilized to charge any of a plurality of devices using a universal power port 104 (e.g., USB) configured to receive a charging cable for any of a plurality of user devices. In some embodiments of the present invention, the mount/receiver 409 can secure/hold and/or charge any of a plurality of types of batteries 102 in the lighting fixture 400.

Figure 5:
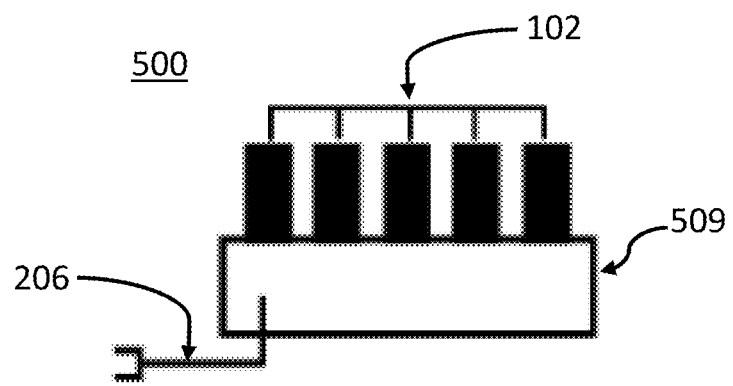
FIG. 5 is a perspective view of an exemplary compact charging device, in accordance with an embodiment of the present invention.

Referring now to FIG. 5, a perspective view of an exemplary compact charging device 500 is illustratively depicted in accordance with an embodiment of the present invention. In some embodiments, the compact charging device 500 can include a mount/receiver portion 509 configured to securely hold and charge a plurality of batteries 102 (e.g., one or more). In the embodiment depicted in FIG. 5, the compact charging device includes spaces to secure and/or charge 5 batteries, but it is to be appreciated that the compact charging device can be configured to secure and/or charge any number of batteries in accordance with various aspects of the present invention. A power port 205 can be plugged into a power source using a power cord 206 (e.g., removable, not-removable) to charge one or more batteries 102. In some embodiments, the compact charging device can include a vending function, similarly to the vending functionality of the power supply dispensing system 600, described as described in further detail herein below with reference to FIG. 11.

Figure 6:
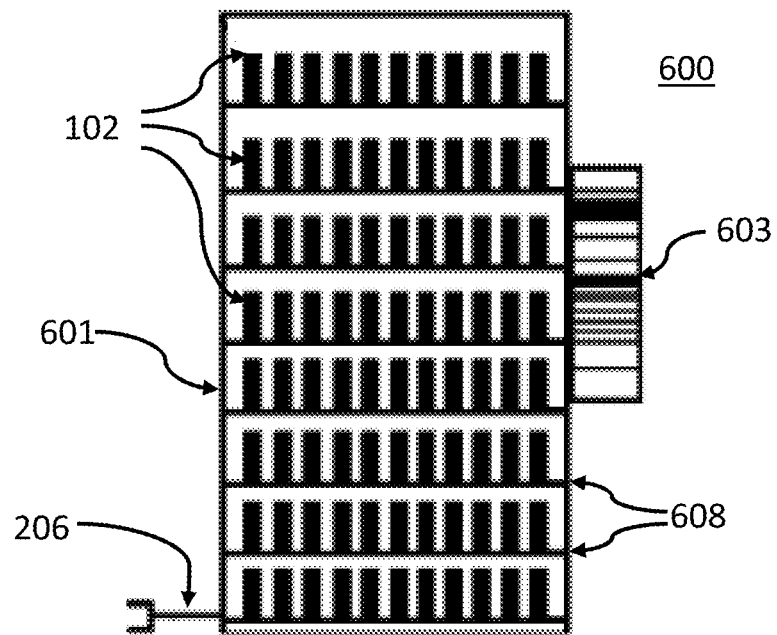
FIG. 6 is a perspective view of an exemplary high capacity charging device and power supply dispenser, in accordance with an embodiment of the present invention.

Referring now to FIG. 6, a perspective view of an exemplary high capacity charging device and power supply dispensing system 600 is illustratively depicted in accordance with an embodiment of the present invention. In some embodiments, the high capacity charging device and power supply dispensing system 600 can function similarly to the compact charging device 500 depicted in FIG. 5, and can include a vending function (e.g., battery exchanging, dispensing, etc.) providing interchangeable, rechargeable batteries using a dispensing machine 601. The dispensing machine 601 can secure and charge any number of batteries 102, using, for example, any of a plurality of number of shelf-type structures 608 (or other appropriate support structures) with a plurality of built-in charging ports (not shown), and/or a plurality of multiple-device capable charging boxes/mounts (e.g., mount/receiver 509) secured inside the power supply charging and dispensing machine 601, etc. in accordance with various embodiments of the present invention.

The dispensing machine 601 can include a power cord 206 (e.g., removable, not-removable) to provide electric power to charge one or more batteries 102, and can be installed at any of a plurality of locations, including, for example, at airports, gas stations, sports venues, movie theaters, music festivals/concerts, hotels, office buildings, malls train stations, etc. In some embodiments, a barcode 603 can be affixed to the dispensing machine 601 to identify and distinguish a particular dispensing machine 601 from other remote dispensing machines (not shown) to, for example, track pickup and drop-off locations of dispensed batteries 102 using, for example, the mobile application 800 described in further detail herein below with reference to FIG. 8.

In some embodiments, a first user with the mobile application 800 can scan a battery barcode 103 from a battery acquired from a dispensing machine 601 by a second user, and the system 600 can update tracking information to reflect the change in possession from the first user to the second user, and update billing charges accordingly. The billing can also be automatically performed using the mobile application 800 of FIG. 8 by charging fees to a user account which includes billing information previously submitted and stored by a user (e.g., for ease of future payments). In some embodiments, a kiosk (not shown) can function similarly to the dispensing machine 601 by using any of a plurality of types of personal user devices (e.g., smartphone, PDA, tablet, etc.) to scan battery barcodes 103 prior to taking possession of the battery. Upon return of the battery 102 by the user, the battery barcode 103 can again be scanned (e.g., to confirm return of the battery, calculate billing amount, charge user account, track user movements/preferences, etc.) in accordance with various aspects of the present invention.

Figure 7:
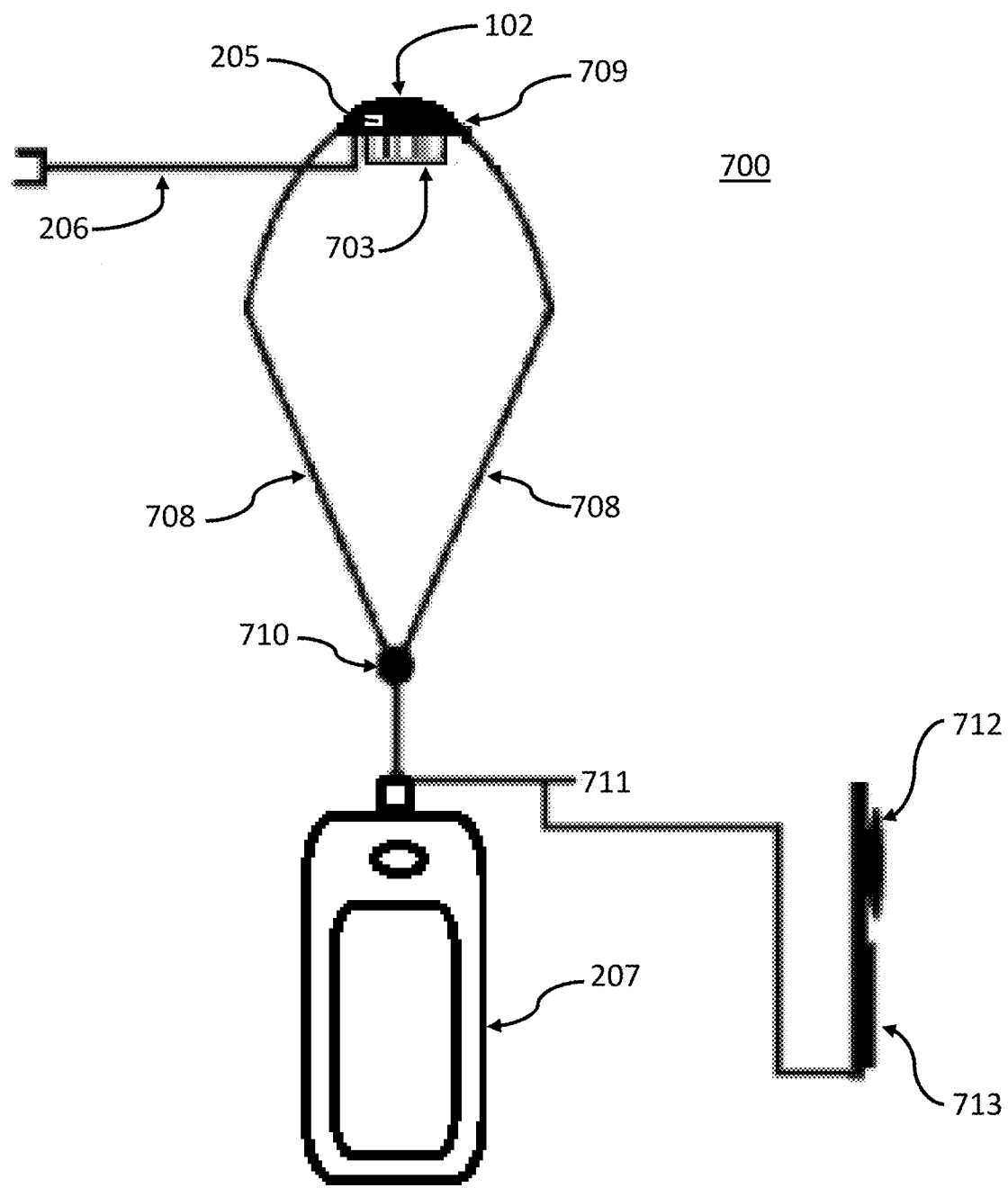
FIG. 7 is a perspective view of an exemplary wearable device holding and charging system with a removable power supply, in accordance with an embodiment of the present invention.

Referring now to FIG. 7, a perspective view of an exemplary wearable device holder system 700 with a removable power supply 102 (e.g., rechargeable battery, non-rechargeable battery) for any of a plurality of user devices 207 is illustratively depicted in accordance with an embodiment of the present invention. In some embodiments, the system 700 include a wearable power and safety lanyard-type holder 708 for personal portable computing devices 207. In various embodiments, the system 700 enables charging of a device 207 while it is securely attached to a lanyard 708 using a connector 711 (e.g., the connector including a locking connection mechanism, non-locking connection mechanism, fixed connection mechanism, etc.) in accordance with aspects of the present invention. In some embodiments, the lanyard 708 can include a size adjusting mechanism 710 (e.g., button, clasp, clip, etc.). In accordance with various aspects of the present invention, a mount/receiver 709 can hold and/or charge any of a plurality of types of batteries 102 in the wearable device holder system 700. A battery 102 can be attached (e.g., externally attached, internally inserted, etc.) and be charged while connected to the mount/receiver 709 using a power port 205 and removable power cord 206 like on FIGS. 2, 3, 4.

In some embodiments of the present invention, the mount/receiver 409 can secure/hold and/or charge any of a plurality of types of batteries 102 in the lighting fixture 400.

In some embodiments, a wearable device holder system 700 can include a mount/receiver 709 configured to hold, secure, and/or receive one or more batteries 102 in accordance with aspects of the present invention. A power port 205 can be plugged into a power source using power cord 206 (e.g., removable, not-removable) to charge one or more batteries 102.

In some embodiments, a barcode 703 can be placed on one or more batteries 102, which can be utilized to, for example, identify and/or track any of the one or more batteries using a mobile device with a specialized application, as described in further detail with reference to FIGS. 8 and 10 herein below. It can also be used with a pocket (e.g., to hold items) or clip 713 (e.g., to secure the device 207 to, for example, a user's clothing) to prevent the device 207 from swinging while the wearable device holding and charging system 700 is being worn by a user. It may also have a button, strap, or ring-shaped attachment 712 to hold your device in your hand more securely 712. Both 712 and 713 can be included into a locking mechanism 711 in accordance with some embodiments of the present invention. In accordance with various aspects of the present invention, the system 700 is a portable and wearable combined battery charger with a power cable inside of and/or attached to a lanyard 708 for charging any of a plurality of electronic devices 207. This system 700 provides a worry-free solution to deliver battery charge to an electronic device 207 when, for example, a conventional power source is not convenient or available.

In some embodiments, wearable device holder system 700 with a removable power supply 102 can include a lanyard 708 or other suitable device capable of being worn and/or held by a user, and can be formed from any appropriate type of material. A battery housing 709 (e.g., mount, receiver, etc.) can be positioned in-line with the neck lanyard 708, and can include a battery 102 (e.g., rechargeable, non-rechargeable) which can be configured to be user removable from the housing 709. The lanyard 708 can include a device charging cable (e.g, integrated, enclosed, attached, etc. to the lanyard) (hereinafter collectively referred to as lanyard 708) to deliver electric power to the device 207 via the connection mechanism 711. The connection mechanism 711 can securely connect the lanyard 708 to an electronic device 207 for charging the device 207 in accordance with embodiments of the present invention.

In some embodiments, the wearable device holder system 700 can include a battery 102 and power cable 206 designed for on-the-go use (e.g., not proximate to a conventional power supply) to charge electronic devices 207. The battery 102 can be recharged either while contained within the battery housing or after being removed from the same. The device charging cable of the lanyard 708 can connect directly to the electronic device 207 using any known type of connector for electronic devices, such as, for example, USB of any size, or proprietary connectors such as those used on APPLE® branded devices in accordance with various embodiments of the present invention.

In accordance with various aspects of the present invention, a locking mechanism can be included as part of the connection mechanism 711 between the power cord and the electronic device 207 being charged, and is configured to securely hold the electronic device 207 in place for a consistent charge and to protect the device from detaching without user interaction. In accordance with various embodiments the connection mechanism 711 can be adjusted to accommodate different types/sizes of electronic devices. The locking mechanism of the connection mechanism 711 not only keeps the connected device charging, but keeps it from being accidentally dropped onto, for example, an surface (e.g., hard, soft, or liquid surface) when user is, for example, engaged in activities such as attending a concert, sporting event, hiking, etc. The locking mechanism can be utilized for any of a plurality of types of devices or device cases for securing the device/device case during use. In various embodiments of the present invention, the connection mechanism 711 can include a universal connector and/or locking mechanism and/or a specialized connector and/or locking mechanism configured to accommodate any of a plurality of different devices of different sizes and weights, and/or different types of connectors.

In some embodiments, the wearable power supply and device support system 700 can include a removable and rechargeable battery 102 (e.g., for repeated use) so that a user can deplete the power in a first battery unit 102 and trade it in to for a fully charged second, third, fourth, etc. battery 102 for connection and or insertion into the system 700. This enables users to continuously power personal computing and other electrical devices without any risk of the device 207 and/or the system 700 being completely drained of power and thus unusable. The batteries 102 can be purchased or handed out and/or returned to designated kiosks (not shown) or a dispenser machine 601 of FIG. 6 in accordance with various embodiments of the present invention. This enables the wearer to never have to worry about if they charged the current battery in the unit if they are leaving the vicinity of a wall outlet, and further provides protection from dropping for the user device 207 The battery in the unit itself can also be re charged over and over again without ever removing the battery form the unit if the user doesn't need extra batteries.

The system 700 can be utilized to protect the connected electronic device 207 and extend the internal battery life of the electronic device 207 when a user is, for example, not in a location where a power outlet is available (e.g., concert/sporting event venue, hiking, beach, etc.), and the lanyard (e.g., neck cord, wrist cord, cord attached using a clip, etc.) can be adjustable to customize a fit for any type/size of end user. The size of the lanyard 708 can be adjusted to any of a plurality of sizes using a size adjusting mechanism 710 (e.g., button, clasp, clip, etc.) in accordance with various embodiments of the present invention. In some embodiments, a clip-type structure 713 can be utilized to secure the device 207 to, for example, a user's clothing to prevent the device 207 from swinging while the wearable device holding and charging system 700 is being worn by a user. In other contemplated embodiments, the electronic device 207 can include an attachable/detachable pocket (not shown) configured to secure personal user items (e.g., credit cards, access cards (e.g., hotels or businesses), money, receipts, etc.) The pocket can, for example, be attached to the device itself 207, attached to a case that the electronic device is contained within (not shown), or the can be an integrated portion of a device case containing any of a plurality of electronic devices.

There are currently no systems of methods which provide users with the freedom and safety for personal devices 207 provided by the system 700 while a device 207 is being charged, and can be utilized as a safety unit to prevent unwanted drops or falls of devices 207 when users are engaging in any of a plurality of activities in accordance with various embodiments of the present invention.

Figure 8:
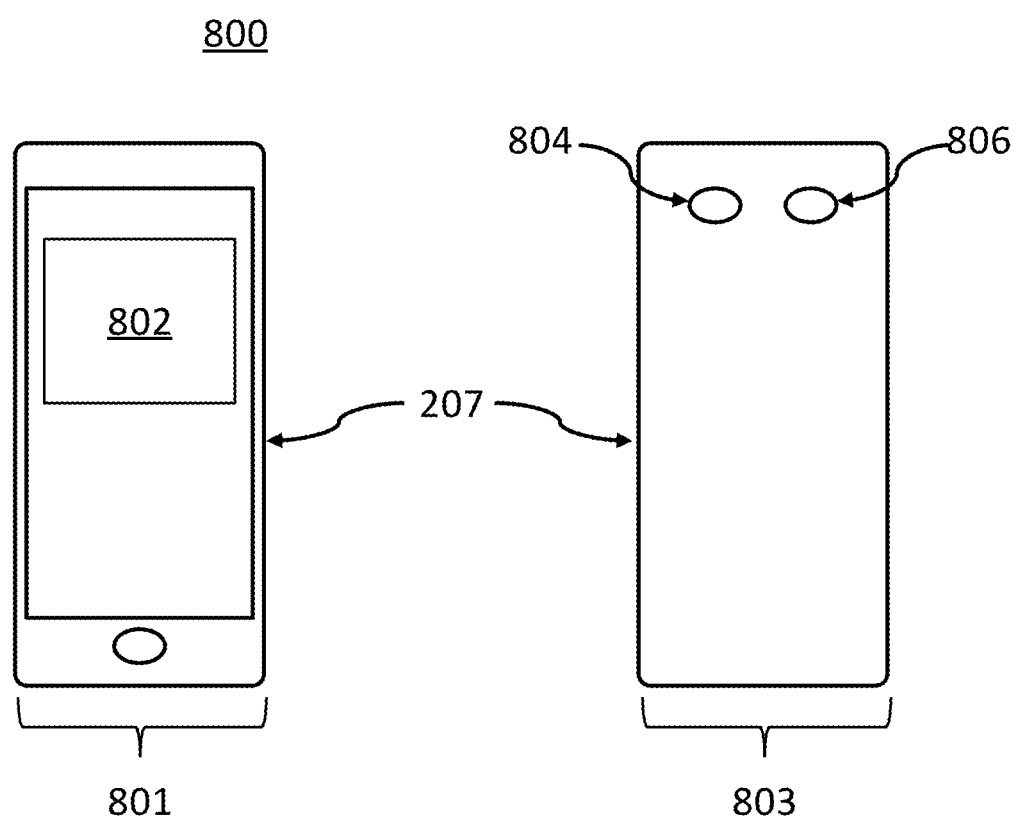
FIG. 8 is an exemplary portable user device for tracking and exchanging one or more removable power supplies, in accordance with an embodiment of the present invention.

Referring now to FIG. 8, an exemplary system 800 including a portable user device 207 (e.g., smartphone, PDA, tablet, etc.) including a specialized application 802 for tracking and exchanging one or more removable power supplies 102 (e.g., rechargeable battery, non-rechargeable battery), as described in further detail with reference to FIG. 1 above, is illustratively depicted in accordance with an embodiment of the present invention. The front side 801 and rear side 803 of the device 207 are shown in accordance with an embodiment of the present invention.

In some embodiments, the device 207 can include a camera 804 and/or a scanner 806 (e.g., QR code scanner, bar code scanner, etc.), and the camera 804 and scanner 806 can be integrated in a single device (not shown) in accordance with aspects of the present invention. The camera 804 and/or scanner 806 can be utilized to scan, for example, a barcode 103 located on battery 102, as described in further detail with reference to FIG. 1 above, a barcode 603 as described in further detail with reference to FIG. 6 above, and/or any scannable image, code, etc. in accordance with various embodiments of the present invention. The personal user information, time information, location information, etc. can be stored in the memory of the device 207 or in any remote or local computer-readable storage medium. In some embodiments, the application 802 can include functionality which enables a user to utilize their own portable personal computing device 207 to reserve and/or receive one or more batteries 102 (e.g., charged batteries) and/or return one or more batteries 102 (e.g., depleted batteries) from, for example, the dispensing machine 601, as described in further detail with reference to FIG. 6 above.

In accordance with various embodiments of the present invention, a user can utilize the system 800 to replace one or more batteries 102 in any of a plurality of portable user devices (not shown). In one embodiment, for a new user, a user can an purchase (e.g., rent, lease, buy, etc.) a fully charged battery 102 or a wearable device holder and charger device 700, as described in further detail with reference to FIG. 7. The user can approach the dispensing machine 601 of FIG. 6, and scan the barcode 603 of FIG. 6 with the device 207 for processing using the mobile application 802. The barcode 603 can be affixed to a receiving/dispensing opening or door, referred to as a barcoded dispenser door 603 herein below for ease of illustration. The application 802 can include any of a plurality of options, including, for example, options for selecting a new battery 102, multiple batteries 102, a type of battery 102, a power cord 206 of FIG. 2, wearable lanyard-type device holding and charging device 700 of FIG. 7, etc.) in accordance with various embodiments of the present invention. The device 207 can communicate (e.g., wireless, hard-wired, attachable cable, etc.) with the dispensing machine 601, and can provide any of a plurality of items (e.g., charged battery 102, power cord 206 of FIG. 2, etc.) in accordance with various aspects of the present invention.

In one embodiment, for a current user needing a charged battery 102, the user can approach a dispensing machine 601 of FIG. 6, scan the barcode 603 of FIG. 6 and/or the barcode 103 of the battery 102 using the device 207 for processing using the mobile application 802. The battery 102 can be inserted into the dispensing machine 601 of FIG. 6, a new battery 102 can be selected using the application 802, and the application can then update tracking information for the returned battery 102, and dispense a new, charged battery 102 to the user. In some embodiments, users who have not completely depleted the power of the battery 102 during use, can receive a credit or refund for unused battery power capacity, and the credit or refund can be applied to the cost of receiving a new battery by a user selection using the application 802.

In some embodiments, when a current user is finished using a battery 102 and no longer wants or needs the battery 102, power cord 206 of FIG. 2, etc. the user can approach a dispensing machine 601, scan the barcode 603 of FIG. 6 and/or the barcode 103 of FIG. 1 using the device 207 for processing using the mobile application 802. In various embodiments, when a user has installed the application 802, the user can enter all personal information in along with credit card info for convenience. All charges and credits can be calculated by the application 802 and charged or credited to user's credit card on file such that no paper money is required to be utilized during the transaction. In accordance with various embodiments of the present invention, the system 600, as described in FIG. 6, can be located at airports, gas stations, sports venues, movie theaters, music festivals/concerts, hotels, office buildings, malls and train stations, and can be integrated into and/or operatively connected with the application 802 using any appropriate connection types (e.g., WiFi, Bluetooth, Internet, intranet, etc.).

Figure 9:
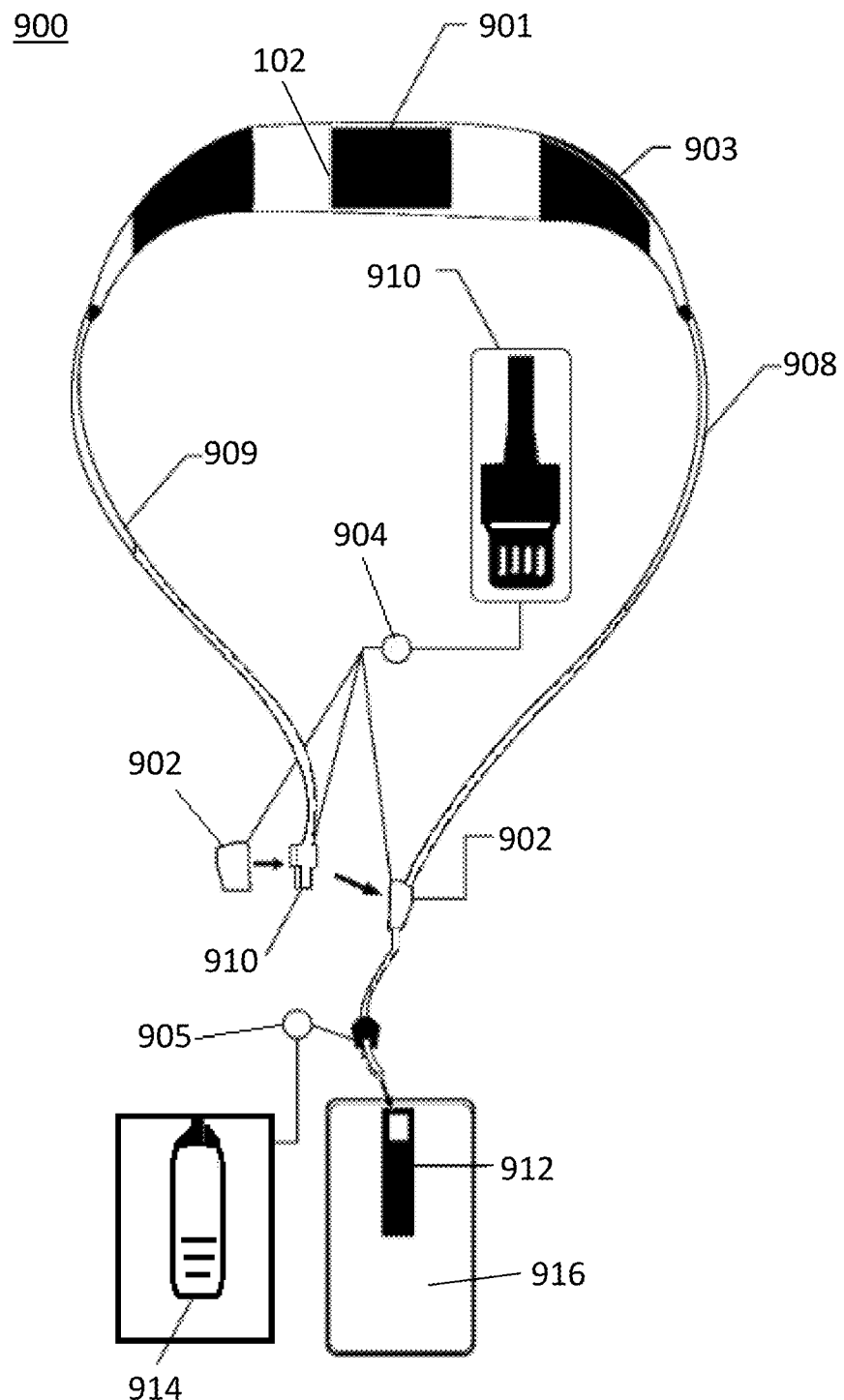
FIG. 9 is a perspective view of an exemplary wearable device holding and charging system with a removable power supply, in accordance with an embodiment of the present invention.

Referring now to FIG. 9, a perspective view of an exemplary wearable device holding and charging system 900 with a removable power supply 102 (e.g., rechargeable battery, non-rechargeable battery) is illustratively depicted in accordance with an embodiment of the present invention. In accordance with aspects of the present invention, a mount or recess 901 located in a housing 903 can receive a battery 102 for providing power to the system 900 for charging one or more user devices 916. The housing 903 can further include a circuit board and/or other appropriate electrical and/or mechanical components to enable various functions of the system 900 in accordance with aspects of the present invention. Any of a plurality of types of power cords and/or connector-types 910 (user interchangeable or universal-type) can be secured using a clip or clasp-type connector 902, or any other type of suitable connection in accordance with various embodiments of the present invention.

The clasp-type connector 902 can include a circuit board and/or other appropriate electrical and/or mechanical components to enable various functions of the system 900 in accordance with aspects of the present invention. In various embodiments, the power cord outlet/USB connector 910 can be positioned at the end of one side of the cord/cable (e.g., lanyard), and can be enclosed within the clip or clasp-type connector 902 to form a closed-loop lanyard for wearing by a user. The clasp-type connector 902 can be opened to expose and release the power cord outlet connector 910, and the power cord outlet connector 910 can be plugged into any appropriate power supply (e.g., USB wall charger, computer USB, etc.) in accordance with embodiments of the present invention. The combination of the clasp-type connector 902 and the power cord outlet connector 910 will be collectively referred to as a removable housing or bottleneck 904 for ease of illustration herein below.

In some embodiments, a non-power supplying base cord/cable 908 (e.g., made from any appropriate material for supporting an attached device 916), and a USB or other power providing type of cord/cable 909 (e.g., made from any appropriate material for powering and supporting an attached device 916) can have distinct, separable end portions, which can be secured together to, for example, wear the device 900 around the neck of a user, using the removable housing 904. It is to be appreciated that the base cord/cable 908 can also be configured to provide power to a user device 916 from the battery 102 using any appropriate type of user device power supply connector 905 (e.g., micro USB, APPLE®, USB-C, etc.) in accordance with various embodiments of the present invention.

In accordance with various aspects of the present invention, any or a plurality of locking (or unlocking) physical connection types 912 can be utilized to secure a device to the powered lanyard cable(s) 908, 909. Non-limiting examples of such physical connection types include, for example, a lockable device mount (e.g., power cord receiver) with an adhesive backing 912, a clickable mechanism 914 configured to connect to a receiving portion of the lockable device mount 912, micro suction tape on either the device, the cable, or both (not shown), a suction cup (not shown), a specialized case with an integrated connector to the removable housing 904 (not shown), etc. in accordance with various embodiments of the present invention.

Figure 10:
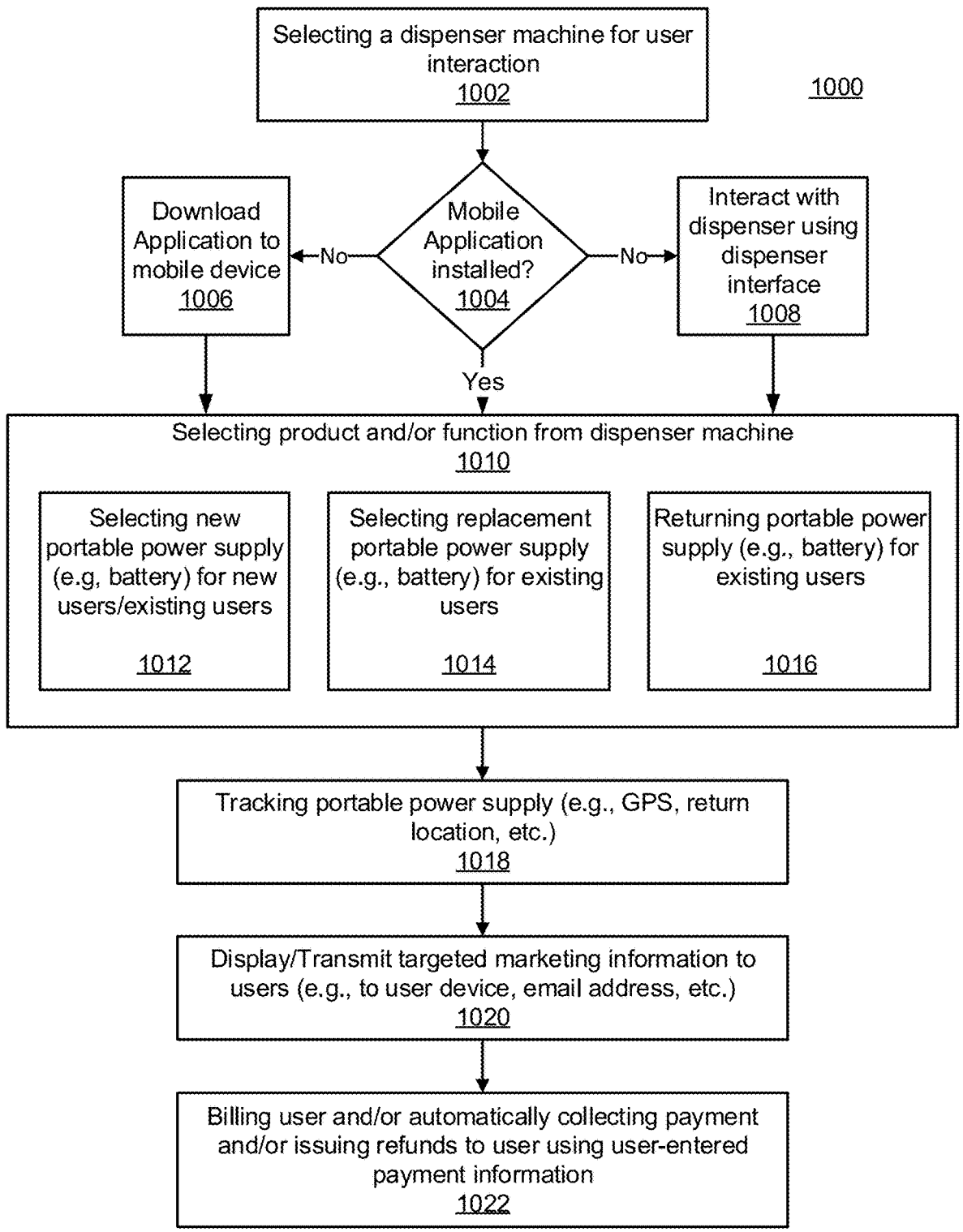
FIG. 10 is a block/flow diagram showing a method for exchanging, dispensing, and/or replacing one or more removable power supplies for one or more user devices, in accordance with an embodiment of the present invention.

Referring now to FIG. 10, a block/flow diagram showing a method 1000 for exchanging, dispensing, and/or replacing one or more removable power supplies for one or more user devices (e.g., wearable device holding and charging system, lighting fixture, speaker, etc.) is illustratively depicted in accordance with an embodiment of the present invention. In block 1002, a dispenser machine can be selected for user interaction. If a specialized mobile application is determined to be installed on a user device (e.g., smartphone, PDA, specialized device for interacting with the dispenser machine, tablet, etc.) in block 1004, a product (e.g., wearable power supply, battery, multiple batteries, power cord, etc.) and/or function (e.g., rent, lease, return, buy, etc.) can be selected in block 1010. If no specialized mobile application is determined to be installed on a user device (e.g., smartphone, PDA, specialized device for interacting with the dispenser machine, tablet, etc.) in block 1004, a user can interact with an interface on the dispenser machine in block 1008 or download the specialized application to a personal computing device in block 1006 prior to selecting a product and/or function from the dispenser machine in block 1010 in accordance with aspects of the present invention.

In accordance with various embodiments of the present invention, new or existing users can select a new (or recharged) portable power supply in block 1012, existing users can select a replacement portable power supply in block 1014, and existing users can return a portable power supply in block 1016. In block 1018, the portable power supplies can be tracked (e.g., remotely monitored) based on, for example, GPS positioning, return location, etc., and targeted marketing information based on entered user data or tracking information from block 1018 can be presented to a user in block 1020. In block 1022 a user can be billed, payment can be automatically collected, and/or refunds can be issued to a user using previously submitted user information in accordance with various aspects of the present invention.

Figure 11:
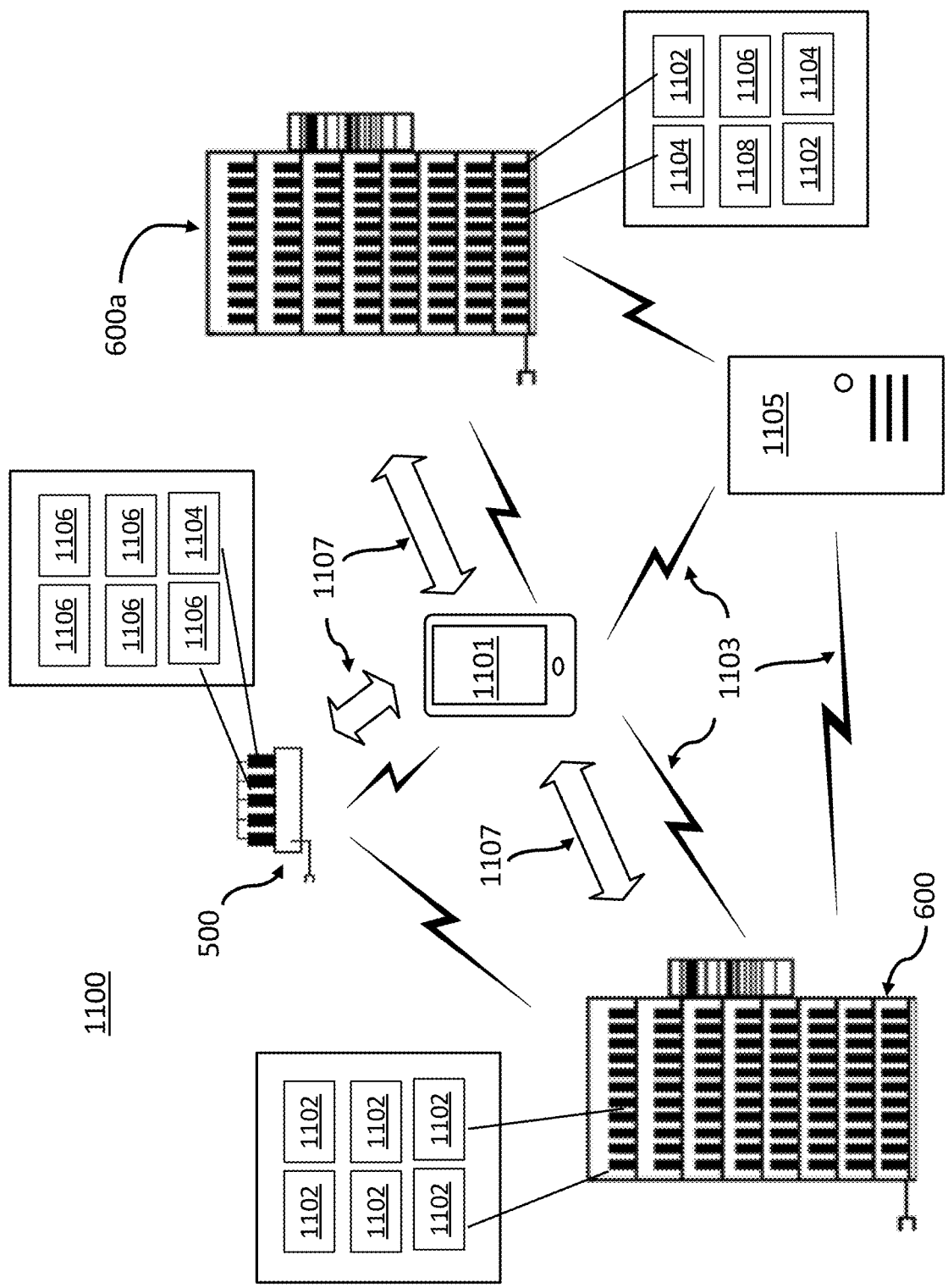
FIG. 11 is a block/flow diagram showing a system/method for personalized, targeted marketing based on data acquired from tracking and exchanging one or more removable power supplies, in accordance with an embodiment of the present invention.

Referring now to FIG. 11, a block/flow diagram showing a system/method 1100 for personalized, targeted marketing based on data acquired from tracking and exchanging one or more removable power supplies is illustratively depicted in accordance with an embodiment of the present invention.

In accordance with various embodiments of the present invention, a user device 1101, such as a portable personal computing device (e.g., smartphone, PDA, tablet, phablet, etc.) can be utilized by an end user for interacting with any of a plurality of dispensing and charging devices 600, 600a, 500 for any of a plurality of vending functions (e.g., purchasing, renting, exchanging, returning and/or charging portable power supplies, and/or otherwise interacting with the dispensing and charging devices 600, 600a, 500). A user can download and install a specialized application for interaction with the system 1100 to a personal user device 1101, and can then request any or a plurality of dispensing functions from the charging devices 600, 600a, 500 in accordance with aspects of the present invention. The user device 1101, dispensing and charging devices 600, 600a, 500, and a centralized computing device 1105 (e.g., server, workstation, laptop, etc.) can be interconnected 1103 (e.g., via a cloud, public internet, intranet, WiFi, Bluetooth, etc.) to each other in any appropriate communication protocol and configuration in accordance with various embodiments of the present invention. The dispensing and charging devices 600, 600a, 500 can include a plurality of portable power supplies, as described above with reference to FIGS. 5 and 6.

In accordance with various embodiments, a dispensing and charging device 600 can be located at, for example, a stadium of a sports team (e.g., Team A), and can include only "Team A" branded portable power supplies at this particular location. A user can then utilize the received power supply 1102, and during the user's movements from place to place throughout the day, the user can travel in any direction along, for example, particular directional paths 1107, and can exchange the received power supply 1102 with any portable power supplies 1102, 1104, 1106, 1108 located at dispensing devices 600, 600a, 500. It is noted that the compact charging device 500 can be a stand-alone device (e.g., on counter at a kiosk, in a taxi, in a restaurant/snack bar, etc.), or can be positioned, for example, on a shelving structure within a larger dispensing device 600, 600a. The compact charging device 500, and the larger devices 600, 600a can be controlled using a specialized application on a user device 1101 in accordance with various embodiments of the present invention.

In some embodiments, each power supply 1102, 1104, 1106, 1108 can include a barcode that a customer can scan with a personal user device 1101 or other compatible computing device using a mobile device application installed on the device 1101. After scanning of a barcode of a battery and/or the dispensing device 500, 600, 600a, relevant information (e.g., location, branding, battery capacity, frequency of scan for each battery, age of battery, etc.) can be processed (e.g., locally or remotely) using, for example, a server device 1105 to determine and present personalized targeted marketing content to a user using, for example, the display of a user device 1101. The portable power supplies 1102, 1104, 1106, 1108 can include a global positioning system (GPS) to track movements of users to acquire data (e.g., location data) for analysis at the server device 1105 for further determination and presentation of personalized targeted marketing content to a user, in accordance with aspects of the present invention.

In some embodiments, the dispensing device 600 can be a "Main Hub" for a particular venue or organization (e.g., Baseball Team A), and can include only Baseball Team A branded power supplies in the dispensing device 600. Targeted marketing content can include, for example, messaging a user's device 1101 with an offer for 2 for 1 tickets to a Team A game if it is determined that the user acquired the power supply 1102 at a Team A main hub dispensing device 600 or other located dispensing device 600a, 500. The dispensing devices 600a and 500 can be a "Distribution Hub" for receiving and/or dispensing any of a plurality of branded power supply types (e.g., sports team, concert venue, car brand, restaurant name, hotel chain, etc.), and these power supplies 1102, 1104, 1106, 1108 can be tracked and monitored for targeted marketing of users as described above in accordance with various embodiments of the present invention. Similarly to dispensing devices 600 and 600a, the compact charging device 500 can function in a similar manner to device 600 (e.g., all same branded power supplies) or device 600a (e.g., differently branded power supplies) in accordance with aspects of the present invention.

In accordance with various embodiments of the present invention, the dispensing devices can be installed in any of a plurality of venues (e.g., theme parks, hotels, sports venues, concert/festival venues, grocery stores, restaurants, hospitals, airports, etc.), and the power supplies 1102, 1104, 1106, 1108 can be configured to be interchangeable between any dispensing device 500, 600, 600a for any of a plurality of vending and/or charging functions.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A wearable device holding and charging system, comprising:
   a lanyard including a housing with a recess configured to receive a user-replaceable portable power supply;
   at least one power providing cable configured to deliver power from the portable power supply to a user device, the at least one power providing cable being further configured to support the user device when the lanyard is worn by a user, the at least one power providing cable comprising at least one side cord portion including a power supply connection at a first end portion and an opposing second side cord portion including a mobile device charging connection at a second end portion, the side cord portions being releasably attachable to each other using a separable connector; and
   a device connector configured to removably secure the user device to the lanyard during charging of the user device while the lanyard is being worn by the user.

2. The device as recited in claim 1, wherein the portable power supply includes an affixed barcode for tracking movement of the portable power supply between two or more battery vending dispensaries.

3. The device as recited in claim 1, wherein the portable power supply includes an integrated global positioning system (GPS) for tracking movement of the portable power supply, and wherein location history data of the integrated GPS is analyzed to generate and present personalized targeted marketing content to the user.

4. The device as recited in claim 1, wherein the lanyard comprises the at least one side cord portion including a USB-type connection at the first end portion, the first end portion being configured to be releasably attachable to the second side cord portion using the separable connector.

5. The device as recited in claim 1, where the portable power supply is configured to securely charge and attach to any of a plurality of types of user devices, the user devices includes the user device.

6. The device as recited in claim 1, wherein the device connector includes a locking mechanism to securely connect and lock the user device to the lanyard, and the separable connector comprises a size adjusting mechanism including a sizing and locking button configured to adjust a length of the lanyard.

7. The device as recited in claim 1, wherein the at least one power providing cable is integrated within the lanyard as a support for the user device.

8. A wearable device holding and charging system, comprising:
   a lanyard including a housing with a recess configured to receive a user-replaceable portable power supply;
   at least one power providing cable configured to deliver power from the portable power supply to a user device, the at least one power providing cable comprising at least one side cord portion including a USB-type connection at a first end portion and a second side cord portion including a mobile device charging connection at a second end portion, the at least one side cord portion configured to be releasably attachable with the second side cord portion; and
   a device connector configured to removably secure the user device to the lanyard during charging of the user device while the lanyard is being worn by a user.

9. The device as recited in claim 8, wherein the at least one power providing cable is further configured to support the user device when the lanyard is worn by the user.

10. The device as recited in claim 8, wherein the first end portion is configured to be releasably attachable to the second side cord portion using a separable clasp-type connector.

11. The device as recited in claim 8, wherein the device connector includes a locking mechanism to securely connect and lock the user device to the lanyard, and the device further comprises a clasp-type connector including a sizing and locking button configured to adjust a length of the lanyard.

* * * * *